United States Patent
Rioux, Jr.

Patent Number: 5,222,132
Date of Patent: Jun. 22, 1993

[54] SUPPORT BRACKET FOR TELEPHONE

[76] Inventor: Robert A. Rioux, Jr., 6175 Crestview Rd., North Syracuse, N.Y. 13212

[21] Appl. No.: 850,847

[22] Filed: Mar. 13, 1992

[51] Int. Cl.$^5$ .................... H04M 1/00; A47B 96/06
[52] U.S. Cl. ........................... 379/455; 379/454; 248/214; 248/231.4
[58] Field of Search .................. 379/449, 454, 455; 5/503, 507, 508; 248/214, 215, 229, 231.4, 231.6, 311.2, 313

[56] References Cited

U.S. PATENT DOCUMENTS

| | | | |
|---|---|---|---|
| D. 308,870 | 6/1990 | Rioux, Jr. | |
| 1,088,669 | 2/1914 | Allen | 379/454 |
| 1,337,869 | 4/1920 | Whitaker | 248/214 |
| 2,517,927 | 8/1950 | Reed | 248/231.4 |
| 2,677,523 | 5/1954 | Henley | 248/265 |
| 2,696,962 | 12/1954 | Goss | 248/477 |
| 2,955,794 | 10/1960 | Robbins | 248/215 |
| 3,511,941 | 5/1970 | Quigley | 379/454 |
| 4,299,344 | 11/1981 | Yamashita et al. | 248/314 |
| 4,432,522 | 2/1984 | Pruente et al. | 379/454 |
| 4,945,561 | 7/1990 | Rioux, Jr. | |
| 4,998,277 | 3/1991 | Rioux, Jr. | |

Primary Examiner—James L. Dwyer
Assistant Examiner—Jack Chiang
Attorney, Agent, or Firm—Wall and Roehrig

[57] ABSTRACT

A telephone support device attaches to a hospital bedrail or similar assembly, and holds a one-piece telephone. The holder comprises an upper female and lower male member that are adapted to interlock in a guided detent mechanism to form a two-part bracket of adjustable length that mounts on the rail assembly. Upper and lower hooks respectively disposed on the upper and lower plates extend rearward over the upper rail and under the lower rail, firmly attaching the bracket to the rail assembly. One or more shelves projecting forward from the front surface of the rear wall defined by the two plates serve as a telephone rest. A pair of lateral retaining members project forward from opposite edges of the rear wall and are adapted receive a telephone instrument. The bracket is stiffened and reinforced by dimples embedded in the members and by suitably placed longitudinal ribs.

15 Claims, 4 Drawing Sheets

SUPPORT BRACKET FOR TELEPHONE

BACKGROUND OF THE INVENTION

This invention relates to an improved telephone system placing a telephone within easy reach of a person confined to a hospital bed. More specifically, this invention relates to an inexpensive telephone and a disposable telephone holder combination that is attachable to the side rails of a hospital-type bed.

Hospitals and other institutions that treat patients having communicable diseases are becoming concerned about difficult to sanitize equipment that might harbor disease carrying organisms. One such piece of equipment is the telephone which now is found almost universally in hospital rooms. The cost of telephone units have been dramatically reduced over recent years so that hospitals now can treat the phone as a disposable item that the patient purchases and thus removes from the room when she or he is released from the hospital.

Heretofore, most hospital room telephones have been placed on a stand positioned next to the bed. A patient in the bed typically has difficulty reaching the phone, particularly when the patient is relatively immobile and the side rails of the bed are in a raised position. The problem is addressed in my U.S. Pat. Nos. 4,945,561 and 4,998,277 which disclose a telephone holder that can be adjustably attached to the side rails of a hospital bed. One embodiment of the disclosed holder involves a pair of jaw-like members that are held in sliding relationship. Each member includes a hook that can be placed over the rails of a hospital bed. A ratchet-like mechanism permits the members to be locked in a desired position in relation to each other. In practice, the jaw members are extended so that the hooks can pass over the bed-rails. The members are then brought together to close the hook over the rails. The ratchet mechanism holds the members in a locked position to prevent the hooks from being dislodged.

The phone system described in the noted Rioux patents works well in practice and solves a longstanding problem in the art. However, it has been found that the phone holder is exposed to a good deal of stress as the telephone is inserted and removed from the holder. The stress is generally intensified when the patient/user's mobility is limited Oftentimes, the telephone is canted as it is entering or leaving the holder which causes a high twisting moment to be exerted on the holder components. This, in turn, can cause breakage and premature release of the ratchet due to binding or deformation of the holder members.

SUMMARY OF THE INVENTION

The present invention, in one important aspect, provides an improved, conveniently adjustable two part telephone holder having increased structural strength and an efficient interlocking design.

It is an object of this invention to provide an improved telephone holder which clamps to upper and lower rails of a bed-rail assembly, such as is found in a hospital bed.

It is a further object of this invention to provide an improved telephone holder which is simple to install, and convenient for a hospital patient.

According to one aspect of the invention, a telephone support device attaches to a hospital bed-rail assembly, and holds a one-piece telephone instrument of the type having an elongated housing. An earpiece, a mouthpiece, a dialer of either the rotary or push-button type, and a hook switch button are all disposed on one side of the housing.

The holder comprises an upper female and lower male plate or member that are adapted to interlock. When engaged, the upper and lower plates together form a two-part bracket that mounts on the bed-rail assembly. Upper and lower hooks respectively disposed on the upper and lower plates extend rearward over the upper bed-rail and under the lower bed-rail, firmly attaching the bracket to the bed-rail assembly One or more shelves projecting forward from the front surface of the rear wall defined by the two plates serve as a telephone rest. A pair of lateral retaining members project forward from opposite edges of the rear wall, and are adapted to resiliently embrace a telephone instrument that is slid into a channel defined by the retaining members and the rear wall. Insertion of the telephone instrument into the channel causes the hook switch button to bear against the front surface of the rear wall when the lower surface of the telephone instrument rests on the shelf, thereby placing the instrument in an on-hook or standby mode.

The length of the rear wall adjusts to match the spacing between the upper and lower bed-rails. It is an important aspect of the present invention that the mechanism of engaging the two plates and accommodating to the spacing of the bed-rails is greatly improved over the prior art. The bracket is economical to manufacture, and resilient in order to slidably accommodate the telephone instrument, and its improved structure facilitates attachment to the hospital bed-rail assembly. The hooks and telephone rests are substantially strengthened by gussets, and the plates are reinforced by longitudinal ribs and stiffened by dimples. As a result, the telephone holder is capable of withstanding the physical stresses of frequent use by a patient and of repeated detachment from the bed-rails and disassembly for transfer to other hospital beds whose bed-rail assemblies may have different geometries.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION OF THE INVENTION

Figure 1:
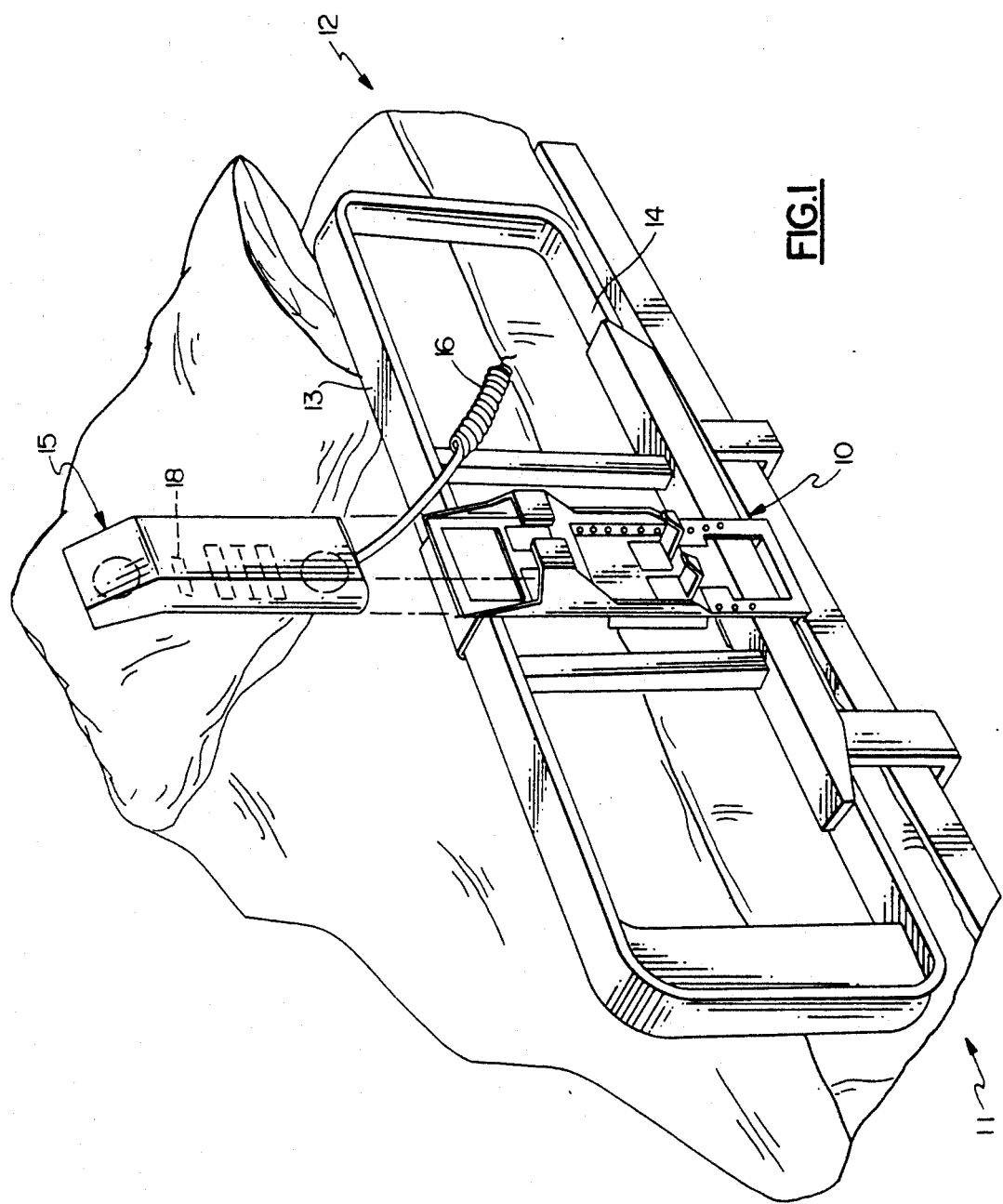
FIG. 1 is a perspective view showing a two-part telephone holder mounted on a hospital bed-rail assembly.

Turning now to FIG. 1 of the drawings, there is shown a telephone holder 10 mounted on a bed-rail assembly 11 on a hospital bed 12. The assembly has an upper horizontal rail 13 spaced above a lower horizontal rail 14. A telephone instrument 15 is shown outside the holder 10 and positioned for insertion therein. This instrument is of the one-piece type and has an elongated body that contains necessary electrical elements, such as a ringer Other facilities, including the mouthpiece, dialing mechanism, either rotary or push-button, and a hook switch 18 are all preferably mounted on one surface, i.e. the side facing the bed-rail assembly 11. The hook switch 18, when depressed, disconnects the telephone instrument, placing it in an on-hook condition. When the hook switch is released, the telephone instrument is placed in an off-hook state. The instrument 15 may be of the cordless type, or a coiled line cord 16 may connect the telephone instrument 15 to a wall outlet (not shown).

Figure 2:
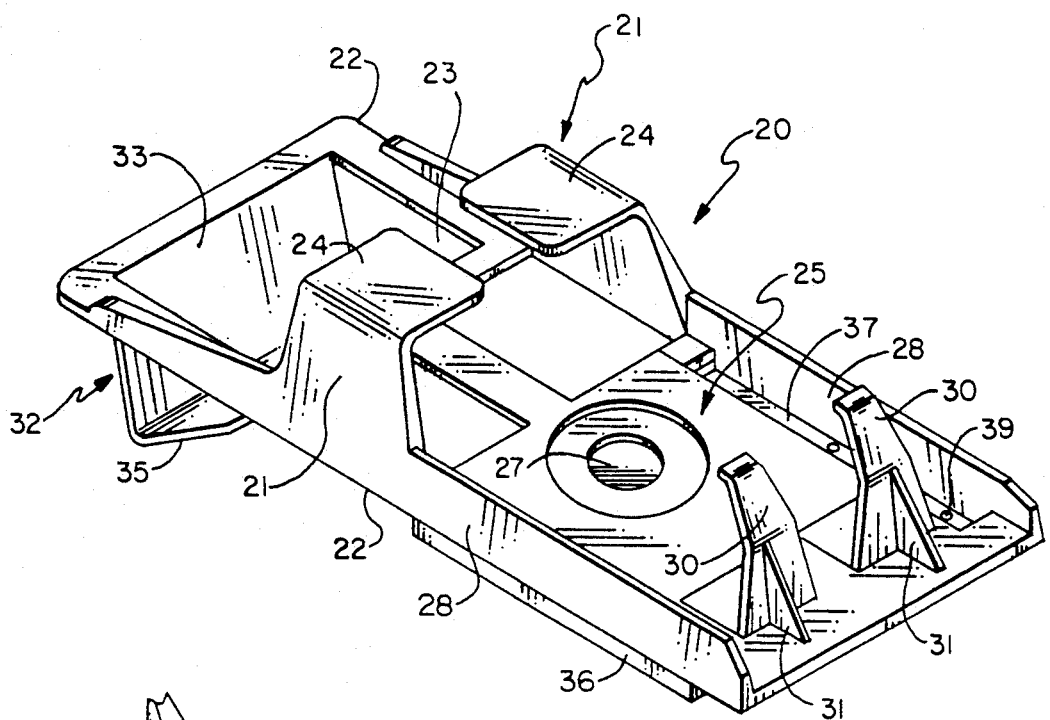
FIG. 2 is a perspective view of an upper plate portion of the two-part telephone holder according to one embodiment of the invention.
Figure 5:
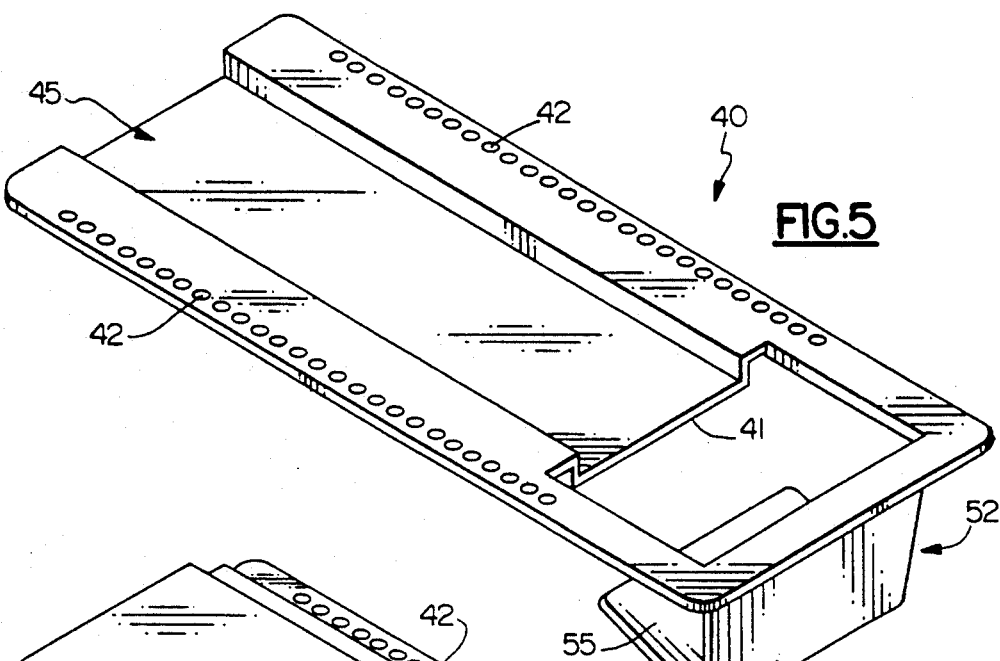
FIG. 5 is a perspective view of a lower plate portion of the two-part telephone holder according to one embodiment of the invention.

The principal components of the telephone holder 10 are shown in FIGS. 2 and 5. The holder comprises upper female plate 20 and lower male plate 40, both formed of a resilient semi-rigid material, and is preferably injection molded of a plastic synthetic resin such as polystyrene, Delrin, or other suitable material.

Upper plate 20 has two retaining members 21, 21 that are disposed on opposite side edges 22, 22 and extending forward therefrom, each retaining member having a front retaining limb that extends toward the other of the retaining members. The retaining members, the front retaining limbs, and the plate together define a channel into which telephone instrument 15 can be slidably inserted, hook switch 18 facing the front side of the rear wall 25 of plate 20. The retaining members 21, 21 yield slightly as the telephone instrument 15 is positioned in the holder. Once the instrument is in place, retaining members 21, 21 and arms 24, 24 elastically embrace the telephone instrument, urging it against wall 25 of the upper plate, so that the hook switch 18 is held depressed against wall 25. This insures that the instrument is in an on-hook condition. Preferably the two front arms 24, 24 have a gap 23 therebetween, so that the channel is generally C-shaped. When the telephone instrument 15 is inserted into the holder 10, line cord 16 easily slips through gap 23 and does not foul on the retaining members 21, 21.

Retaining members 21, 21 extend along the side edges of plate 20 as forward projecting ribs 28, 28. The ribs strengthen the retaining members as well as adding strength and rigidity to the plate as a whole.

Dimple 27, placed in wall 25 in a generally central location, further contributes to the structural rigidity and stability of plate 20.

A telephone cradle, formed by shelves 30, 30, is disposed on the forward side of the rear wall 25 and are spaced apart by a gap that can readily accommodate line cord 16. Gussets 31, 31 maintain the shelves orthogonal to the plate and buttress them so that they can support the telephone instrument 15 and not give way, even if the instrument should strike the shelves 30, 30 with force. Some types of telephone instrument 15 could have a hook switch disposed on the inferior surface of the housing, which would be depressed beneath the weight of the instrument whenever it rests on shelves 30, 30, thereby maintaining the instrument in an on-hook condition.

Figure 4:
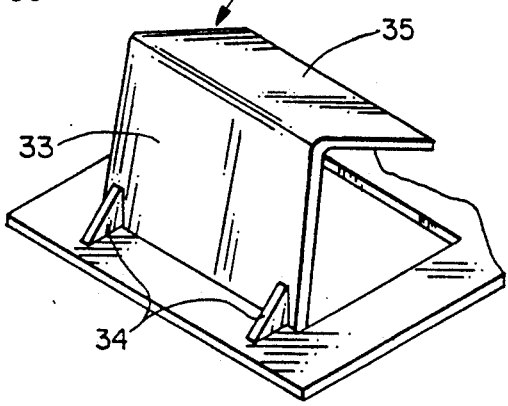
FIG. 4 is a perspective partial view of the lower aspect of the plate depicted in FIG. 2.

At the upper edge of the rear surface of rear wall 25 is an upper hook 32 which secures to upper bed-rail 12 in FIG. 1. The upper hook has a flange 33 that extends rearward from wall 25 and a down-turned lip 35 that reaches behind rail 12. The flange 33 and lip 35 preferably form an acute angle. Gussets 34, 34, shown in FIG. 4, reinforce flange 33.

Figure 3A:
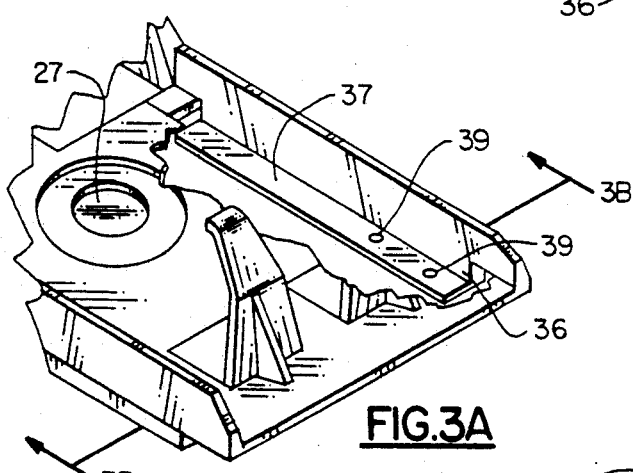
FIG. 3A is a partially cut-away perspective view of the upper plate shown in FIG. 2.
Figure 3B:
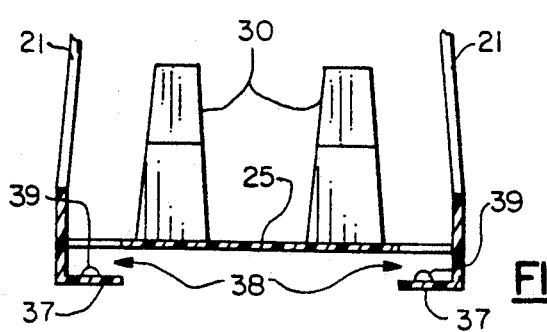
FIG. 3B is a sectional view of the upper plate shown in FIG. 3A along lines 3B—3B.

Near the lower edge of wall 25 are disposed an opposed pair of laterally positioned flanges 36, 36. These flanges (see FIG. 3) are orthogonal to the rear surface of wall 25 and extend rearward, each having a rear lip 37 that extends generally toward the opposing rear lip. On the front surfaces of the rear lips 37 are a plurality of raised studs or pins 39, 39, the functions of which are explained below. The flanges 36, rear lips 37 and wall 25 constitute a housing, and also define a pair of slots 38, 38 into which lower plate 40 can be inserted to interlock the two plates.

Figure 6:
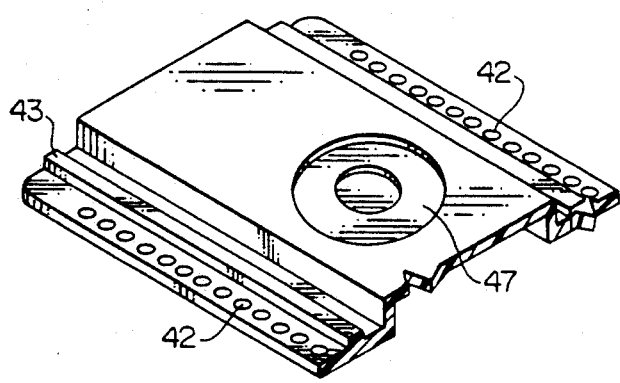
FIG. 6 is a partial perspective rear view of the lower plate shown in FIG. 5.
Figure 7:
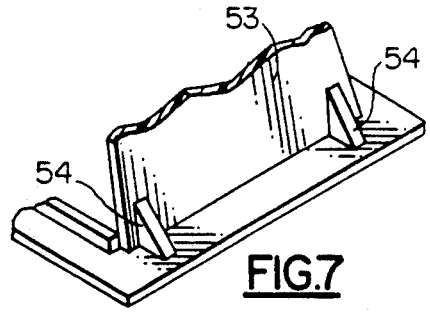
FIG. 7 is a perspective bottom view of the lower plate shown in FIG. 5.

Referring to FIGS. 5, 6 and 7, there is shown lower plate 40, that is received by the slots 38, 38. Lower plate 40 is furnished with a lower hook 52 which secures to lower bed-rail 13 in FIG. 1. The lower hook has a flange 53 that extends rearward from wall 45 and a up-turned lip 55 that reaches behind rail 13. The flange 53 and lip 55 preferably form an acute angle. Gussets 54, 54 reinforce flange 53.

Opposed lines of perforations 42, 42 are bored through plate 40 adjacent the lateral edges thereof. Parallel raised ribs 43 (see FIG. 6) are included in the preferred embodiment. The ribs extend longitudinally, and are disposed on the front surface of wall 45 proximate lines of perforations 42, 42 and medial thereto. It is possible to operate the apparatus without ribs 43, 43; however they contribute greatly to the stability of the assembled bracket.

Lower plate 40, like upper plate 20, is furnished with a dimple 47 to increase its stiffness, and to insure that the plate does not buckle during insertion into slots 38, 38.

Figure 8:
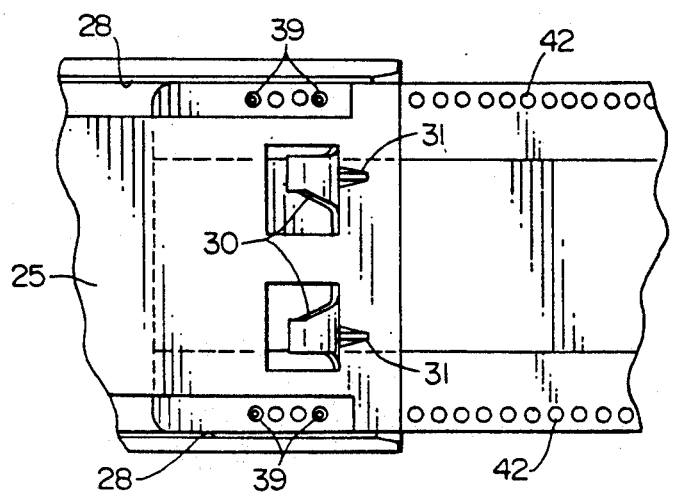
FIG. 8 is a front elevation of the interlocked portions of the upper and lower plates of FIGS. 2 and 5.

The two-part bracket in accordance with the invention is assembled by inserting the upper end of lower plate 40 into the slots 38, 38 that are defined in upper plate 20. Proper orientation of the two plates is assured by offset portion 41 of wall 45, which, in combination with wall 25, functions in a lock-and-key combination. As the two plates engage, raised ribs 43 bear on the medial edges of rear lips 37, 37, guiding the two plates into alignment, and preventing angular deviation. The plates 20, 40 are configured so that perforations 42 align with studs 39, 39, and thus form a detent mechanism; particular perforations 42 are selected by the user to engage studs 39, 39 in accordance with a desired length of the bracket that corresponds to the interspace between bed-rails 12, 13. Flanges 36 are resilient and displace sufficiently to allow the studs to penetrate the perforations. Once this has occurred, flanges 36 elastically return to their original position, and the two plates are firmly interlocked, as can be appreciated with reference to FIG. 8. The interlocked plates are then presented to the bed-rail assembly, positioned so that upper hook 32 and lower hook 33 are proximate upper bed-rail 12 and lower bed-rail 13 respectively. Upper hook 32 and lower hook 33 can then be snapped into place, engaging the bed-rails and securing telephone holder 10 to bed-rail assembly 11, whereupon the telephone holder is ready to accept telephone instrument 13. The telephone instrument is positioned vertically and oriented such that the mouthpiece, dialer, and hook switch 18 face the bed-rail assembly. Line cord 16, if present, is passed through gap 23 between retaining members 21, 21, and through the gap between shelves 30, 30. The telephone instrument is then slid into the channel defined between wall 25 and retaining members 21, 21, and is cradled on shelves 30, 30, hook switch 18 being depressed by wall 25. When it is desired to use the telephone, the instrument 15 is simply lifted out of telephone holder 10, at which time hook switch 18 releases, placing the instrument off-hook.

Disassembly is accomplished by essentially reversing the assembly process. First the telephone instrument is removed from holder 10. As the plates 20, 40 are constructed of a resilient material, upper hook 32 and lower hook 33 can be gently disengaged from the bed-rail assembly 11. The holder is now ready to be transported to another location where it can be reattached to another hospital bed-rail assembly. If desired, disassembly can be carried even further. By employing a bending motion, the wall 25 can be displaced from the front surfaces of rear lips 37, permitting perforations 42 to disengage from studs 39. Once this has occurred, application of additional bending force further deforms the wall 25, and allows lower plate 40 to be pulled free of slots 38, 38. The two plates can then be compactly arranged for storage or shipment.

Figure 9:
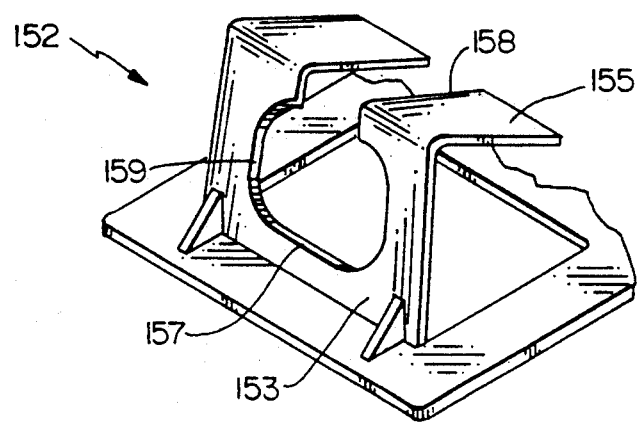
FIG. 9 is a partial perspective view of an alternative embodiment of the holder.
Figure 10:
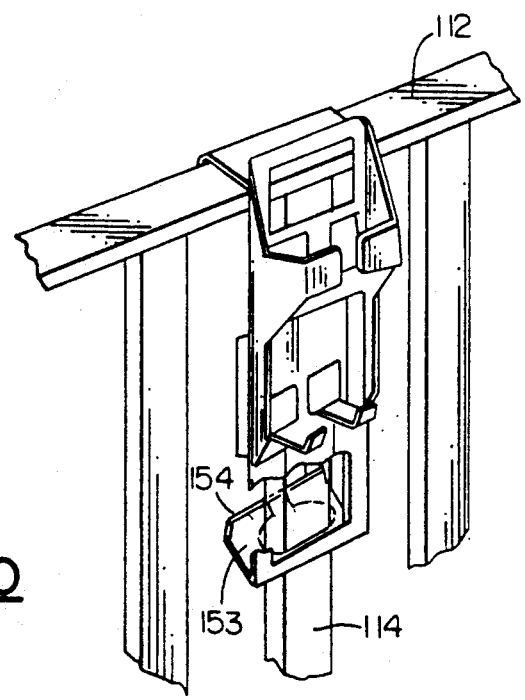
FIG. 10 is a perspective view of the embodiment of FIG. 9 mounted on a bed-rail assembly.

Turning now to FIGS. 9 and 10, an alternate embodiment of the invention is shown in which like numbered parts have reference numerals advanced by 100. This embodiment is particularly useful for hospitals bed-rail assemblies of the type having a single upper horizontal bed-rail 112 and a vertical post or rail 114. As most of the parts and functions of the telephone holder 110 are identical to the first embodiment, their description will not be repeated for purpose of brevity.

Lower hook 152 has a cut-out 157 that extends from the free edge of upper lip 155 into flange 153. The purpose of this cut-out is to receive the shaft of vertical post 114 when holder 110 is mounted on bed-rail assembly 110. Cut-out 157 has a relatively narrow portion 158 and an approximately circular enlarged portion 159 disposed in flange 153. As post 114 is slipped through portion 158, the sides of lip 155 may separate somewhat; then as the rail passes into enlarged portion 159, the sides elastically retract, thereby snapping vertical post 114 firmly into place, the post now being encircled by enlarged portion 159.

While this invention has been explained with reference to the structure disclosed herein, it is not confined to the details set forth and this application is intended to cover any modifications and changes as may come within the scope of the following claims:

What is claimed is:

1. In combination, a one-piece telephone instrument and a hospital room telephone support for supporting the one-piece telephone instrument from a bed side unit that has first and second horizontal rails spaced a distance apart;
   the telephone instrument comprising an elongated body having an earpiece, a mouthpiece, and a hook switch; and
   the telephone support comprising a two part bracket mountable on the rails, said bracket comprising
      an upper member having front and rear surfaces, and a rearwardly projecting upper hanger means for engaging said first rail;
      a lower member having front and rear surfaces, and rearwardly projecting lower hanger means for engaging said second rail, said upper member and said lower member being slidably related to form an adjustable bracket means;
      means for interlocking said upper member and said lower member, comprising
         a pair of open-sided flanges, disposed on opposite lateral edges of the rear surface of one of said members, the open sides of said flanges facing each other and being arranged to slidably receive therein the other of said member;
         said rear surface of said other member having a plurality of perforations adjacent said lateral edges, said perforations arranged to engage detent pins mounted inside the open-sided flanges of said one member; and
      a pair of retaining elements disposed on opposite side edges of said two part bracket and extending generally forward therefrom, each retaining element having a front retaining section that extends toward the other retaining element, said retaining elements being formed of a resilient semirigid material, said retaining elements and said front surface of said two part bracket defining a channel for slidably receiving said telephone instrument, whereby said retaining elements embrace said telephone instrument and urge said telephone instrument against said front surface so that the hook switch is held depressed against said two part bracket when said telephone instrument is retained in said channel.

2. The combination of claim 1, wherein said upper and lower members are each constructed of a plastic material and have a dimple, whereby said members are stiffened.

3. The combination of claim 1, further including a shelf projecting in a forward direction from said two part bracket for supporting said telephone instrument, wherein said upper and lower hanger means and said shelf each have a reinforcing gusset that attaches to said two part bracket.

4. The combination of claim 1, wherein said rear surface of said other member has a pair of longitudinal ribs disposed near said opposite lateral edges thereof, and the sides of said longitudinal ribs bear on said open sides of said flanges when said upper member engages said lower member.

5. The combination of claim 1, wherein said lower hanger means has a cut-out configured to receive a vertical rail for mounting thereon.

6. Telephone apparatus for mounting a telephone upon side rails of a hospital bed comprising adjustable bracket means having a male member slidably received within a female member whereby a length of the bracket means is adjustable,
   said female member having open-sided, elongated horsing means positioned along opposing edges thereof for enclosing opposing edge sections of the male member, whereby one member is slidably contained within the other;
   elongated, raised ribs on said male member which ride in close sliding contact with said housing means to both strengthen said male member and to guide said male member as it moves through said housing means; detent means acting between the edge section is of the male member and the housing means of the female member;

attaching means mounted on said male and female members for removably engaging the side rails of a hospital bed to secure the bracket to said bed, and retaining means mounted on one of said members for removably supporting a telephone therein.

7. The telephone apparatus of claim 6, wherein said attaching means includes a hanger means mounted on each of said members that is capable of passing over a rail whereby the bracket can be clamped between parallel rails by slidably adjusting the bracket means.

8. The telephone apparatus of claim 7, wherein said hanger means includes a first leg orthogonally extended from the associated member and a second leg depending from a distal end of said first leg.

9. The telephone apparatus of claim 8, wherein said second leg and said first leg form an acute angle.

10. The telephone apparatus of claim 8, that further includes gusset means connected to the first leg of said hanger means for supporting said first leg in a perpendicular position.

11. The telephone apparatus of claim 6, wherein one of said hanger means further includes a cut-out so that said hanger means can be snapped over a post extending between the rails.

12. The telephone apparatus of claim 6, wherein said detent means further includes a series of spaced-apart holes formed along the edge sections of said male member and a detent pin mounted inside each housing of the female member for engaging one of said holes to hold the members in a desired relationship.

13. The telephone apparatus of claim 12, wherein a plurality of detent pins are mounted within each of the housing means.

14. The telephone apparatus of claim 6, wherein said retaining means includes cradle means mounted upon the female member on the side opposite said open-sided housing means, and said female member further includes elongated medially directed lips extending along the side edges of said open-sided housing means of the female member, said lips bearing against sides of said raised ribs of said male member when said male member and said female member are slidably engaged.

15. Telephone apparatus for mounting a telephone upon side rails of a hospital bed comprising adjustable bracket means having a male member slidably received within a female member whereby a length of the bracket means is adjusted, said female member having open-sided, elongated housing means positioned along opposing edges thereof for enclosing opposing edge sections of the male member, whereby one member is slidably contained within the other, elongated, raised ribs on said male member which ride in close sliding contact with said housing means to both strengthen said male member and to guide said male member as it moves through said housing means;

said female member further including elongated medially directed lips extending along the opposing edges of said open-sided housing means, said lips bearing against sides of said raised ribs of said male member when said male member and said female member are slidably engaged;

detent means acting between the edge sections of the male member and the housing means of the female member, said detent means including a series of spaced-apart holes formed along the edge sections of said male member and a detent pin mounted inside each housing means of the female member for engaging one of said holes to hold the male and female members in a desired relationship;

a hanger means mounted on said male member and said female member that is capable of passing over a rail whereby the bracket can be clamped between parallel rails by slidably adjusting the bracket means, one of said hanger means including a cut-out so that said one hanger means can be snapped over a post extending between the rails, and a leg of said hanger means having gusset means connected thereto for supporting said leg in a perpendicular position on said male and female members; and retaining means mounted on one of said male member and said female member for supporting a telephone instrument therein.

* * * * *